United States Patent

Bickford et al.

[11] Patent Number: 5,986,979
[45] Date of Patent: Nov. 16, 1999

[54] PLAY LIST CONTROL METHOD AND SYSTEM FOR

[75] Inventors: Brian Lee Bickford, Kokomo; Amahl Kenneth Brown, Indianapolis; Dan Darryl Carman, Russiaville; Edward Dickson Catlett, Noblesville; Gary Edward Goodwin, Westfield; James Alan Kleiss, Kokomo; Ronald Julius Szabo, Noblesville, all of Ind.

[73] Assignee: Delco Electronics Corporation, Kokomo, Ind.

[21] Appl. No.: 08/951,226

[22] Filed: Oct. 16, 1997

[51] Int. Cl.⁶ ..................................................... G11B 17/22
[52] U.S. Cl. ..................................... 369/32; 369/30; 369/2
[58] Field of Search ................................... 369/32, 33, 30, 369/34, 35, 36, 38, 41, 178, 184, 180, 2, 6, 4

[56] References Cited

U.S. PATENT DOCUMENTS

| | | |
|---|---|---|
| 4,779,252 | 10/1988 | Custers et al. .............................. 369/32 |
| 4,949,322 | 8/1990 | Kimura et al. .............................. 369/32 |
| 5,109,365 | 4/1992 | Watanabe et al. .......................... 369/32 |
| 5,168,481 | 12/1992 | Culbertson et al. .......................... 369/2 |
| 5,228,015 | 7/1993 | Arbiter et al. .............................. 369/33 |
| 5,392,264 | 2/1995 | Hira .......................................... 369/32 |
| 5,394,384 | 2/1995 | Aoyagi et al. .............................. 369/32 |
| 5,467,326 | 11/1995 | Miyashita et al. ........................ 369/30 |
| 5,481,509 | 1/1996 | Knowles .................................... 369/30 |
| 5,568,455 | 10/1996 | Balsom ...................................... 369/30 |

*Primary Examiner*—Ali Neyzari
*Attorney, Agent, or Firm*—Jimmy L. Funke

[57] ABSTRACT

A method is provided for altering a play list of a Random Access Player without interrupting the generation of output by the Player. The method includes initiating a reproduction mode that activates the Random Access Player, commencing the generating of output by the Random Access Player and receiving play list requests while the Random Access Player is generating the output, and processing the received play list requests while the Random Access Player is generating the output such that the play list is altered without interrupting the generation of output by the player.

15 Claims, 10 Drawing Sheets

PLAY LIST CONTROL METHOD AND SYSTEM FOR

BACKGROUND OF THE INVENTION

1. Field of the Invention

The present invention generally relates to random access players, and more particularly to an apparatus and method for generating and modifying a play list of a random access player.

2. Description of the Related Art

Random access players have become a popular audio and video system component. These players, which include Compact Disc (CD), Mini Disc, and Digital Versatile Disc players, have the capability to generate audio and video from digital information contained on a recording medium (e.g. a disk that is written (recorded) and read by light, also referred to as an optical disc). Generally, the digital information is stored on the recording medium in tracks, which are continuous streams of bits, recorded one after the other. The tracks can be used to form a collection of interrelated data (i.e., a data set) that are used to create an information set that defines a particular audio or video segment (e.g., a movie or a song).

Random access players are capable of reproducing sounds or images in a sequence other than the order that the tracks are organized on the disc, i.e. the information sets contained on a disc may be randomly accessed. This provides the capability to select those tracks that a user would like to hear or see and skip those that are not desired.

A feature of random access players that has gained popularity is the play list function. This function allows an individual to generate, store and subsequently alter a personalized order in which the player is to reproduce the tracks. While a play list provides a convenient means by which an individual may tailor the sequencing of audio or video information sets for maximum listening or viewing enjoyment, there are some difficulties and disadvantages associated with play list creation and modification.

Prior to the present invention, the creation or modification of a play list involved entering a dedicated programming mode that inherently terminated or at least interrupted player generation of sounds or images. In addition, the user was required to use a system display in order to make a selection (e.g. a liquid crystal display (LCD) that shows a numerical reference for each disc record). Furthermore, prior to the present invention, a user was required to manipulate a complex array of play list interface controls.

In view of the foregoing, it is an object of the present invention to provide a system and methodology that provides a play list for a random access player that does not require user activation of a dedicated programming mode which inhibits or halts audio or video generation. It is a further object of the present invention to provide a system and method that allows generation and manipulation of a play list with a simplistic arrangement of interface controls utilizing audio output of the player. Furthermore, additional advantages and features of the present invention will become apparent from the subsequent description and appended claims, taken in conjunction with the accompanying drawings.

SUMMARY OF THE INVENTION

An apparatus and method is provided for altering a play list of a Random Access Player without interrupting the generation of output by the Player. The method includes initiating a reproduction mode that activates the Random Access Player, commencing the generating of output by the Random Access Player and receiving play list requests while the Random Access Player is generating the output, and processing the received play list requests while the Random Access Player is generating the output such that the play list is altered without interrupting the generation of output by the player. The apparatus includes the devices for performing the method steps outlined above.

BRIEF DESCRIPTION OF THE DRAWING

Other objects and advantages of the invention will become apparent upon reading the following detailed description and upon reference to the following drawings, in which.

DESCRIPTION OF THE PREFERRED EMBODIMENTS

The following description of the preferred embodiments is mainly exemplary in nature and is in no way intended to limit the invention or its application or uses.

Figure 1:
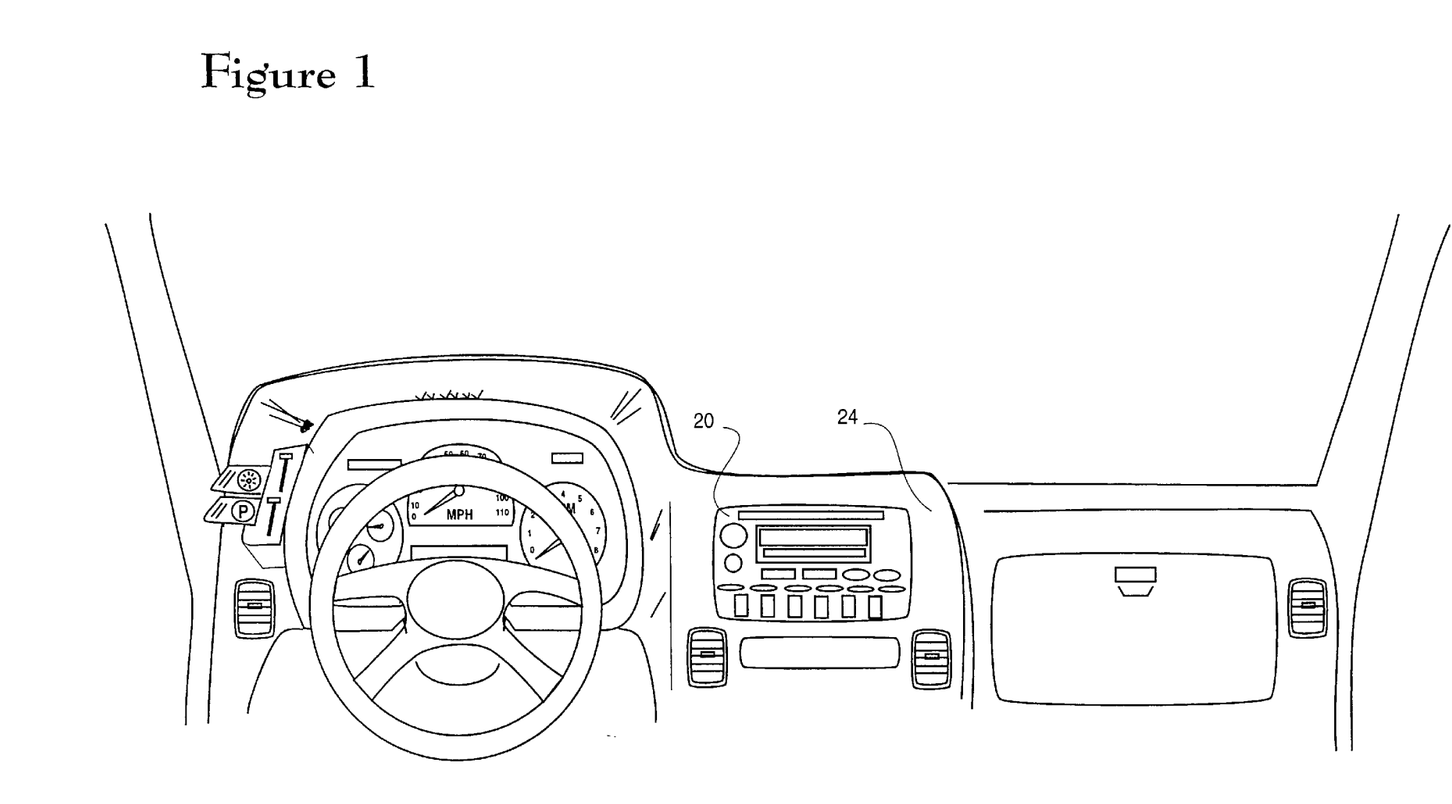
FIG. 1 is an elevational schematic view showing an automobile instrument panel that houses a car stereo with a random access player having the play list of a preferred embodiment of the present invention.
Figure 2:
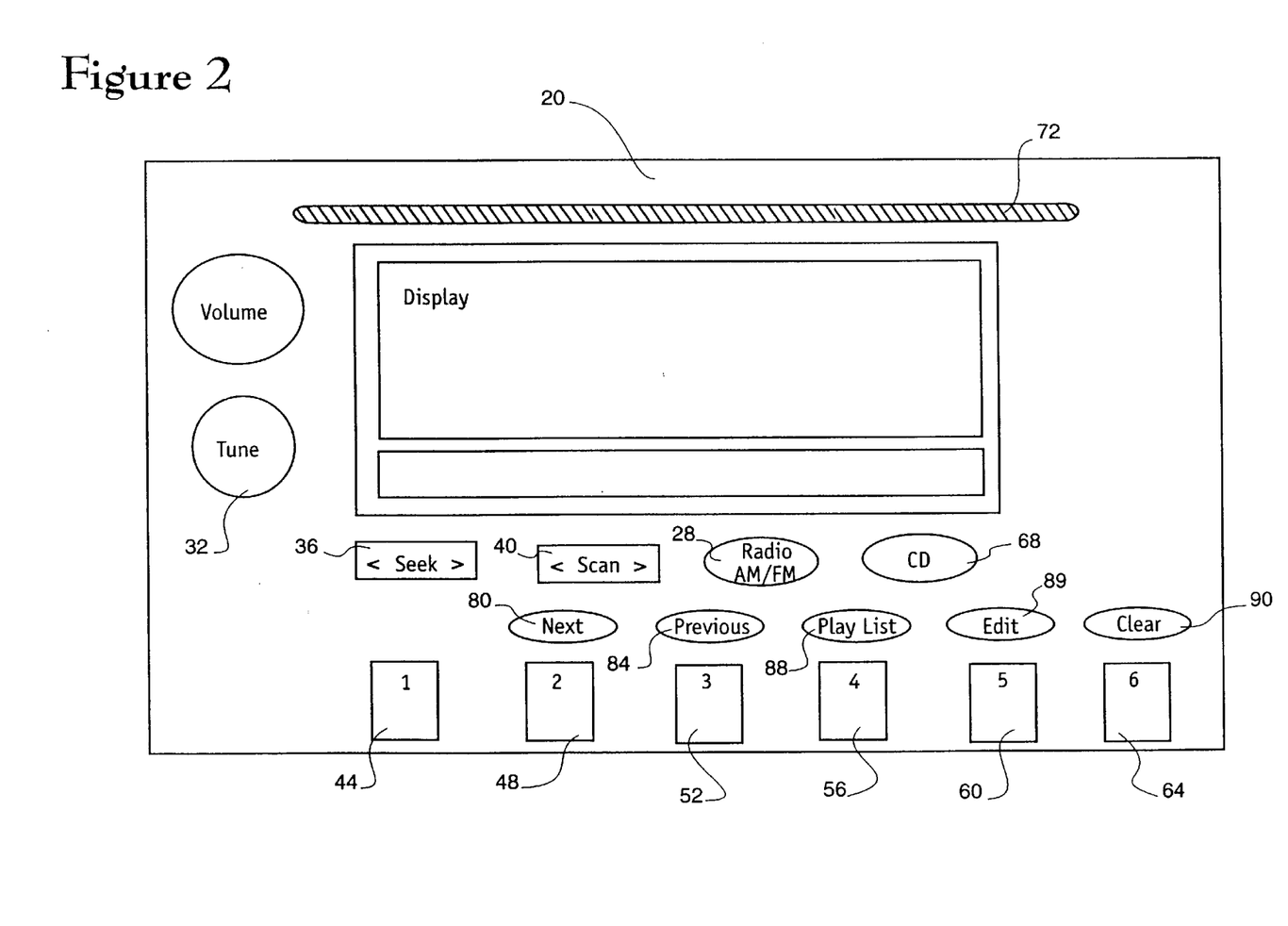
FIG. 2 is an enlarged view of the audio system of FIG. 1.

FIG. 1 shows an audio system 20 located in the front instrument panel 24 of an automobile, and FIG. 2 provides an enlarged view of the audio system 20. Referring to FIG. 2, the audio system 20 has an AM/FM radio and a random access player in the form of a Compact Disc (CD) player, with the CD player having a play list according to a preferred embodiment of the present invention.

The radio is activated with a radio function button 28 and may be tuned to a desired frequency with a frequency tuning knob 32. Furthermore, a station seek button 36 and a station scan button 40 are provided for user selection of radio frequencies, and six station preset buttons (44,48,52,56,60, 64) provide the ability to store and recall user selected radio frequencies. It should be understood that the radio may have more or less capabilities than as presented herein. Furthermore, the system may have additional components (e.g. a tape player) without deviating from the scope of the present invention.

The CD Player is activated with a CD function button 68 and reproduces audio based upon digital information contained on a CD that has been placed in the disc aperture 72. Once the CD has been placed in the disc aperture 72 and the CD function key 68 is pressed.

As previously indicated, information on the CD is generally stored in tracks that form data sets used to create information sets that define a particular audio or video segment, and in this illustration, the information sets correspond to individual songs. The songs may be accessed in any order (i.e. randomly accessed) with the next button 80 and previous button 84. This provides the ability to select a song without having to sequentially listen to all the other songs on preceding tracks of the CD.

The CD player also has the capability to identify information sets on the CD and subsequently implement a sequence of play that is different than the sequence of the information sets that are stored on the CD, such that a customized play sequence (i.e., play list) may be initiated, thereby maximizing listening enjoyment. As will be subsequently discussed, the play list may be prepared and modified using a simplistic arrangement of interface controls, including: using a single control button (play list button 88); using two control buttons (play list button 88, and edit button 89); or using three control buttons (play list button 88, edit button 89, and clear button 90). FIG. 2 shows a CD player with all three buttons (88,89,90).

Figure 3:
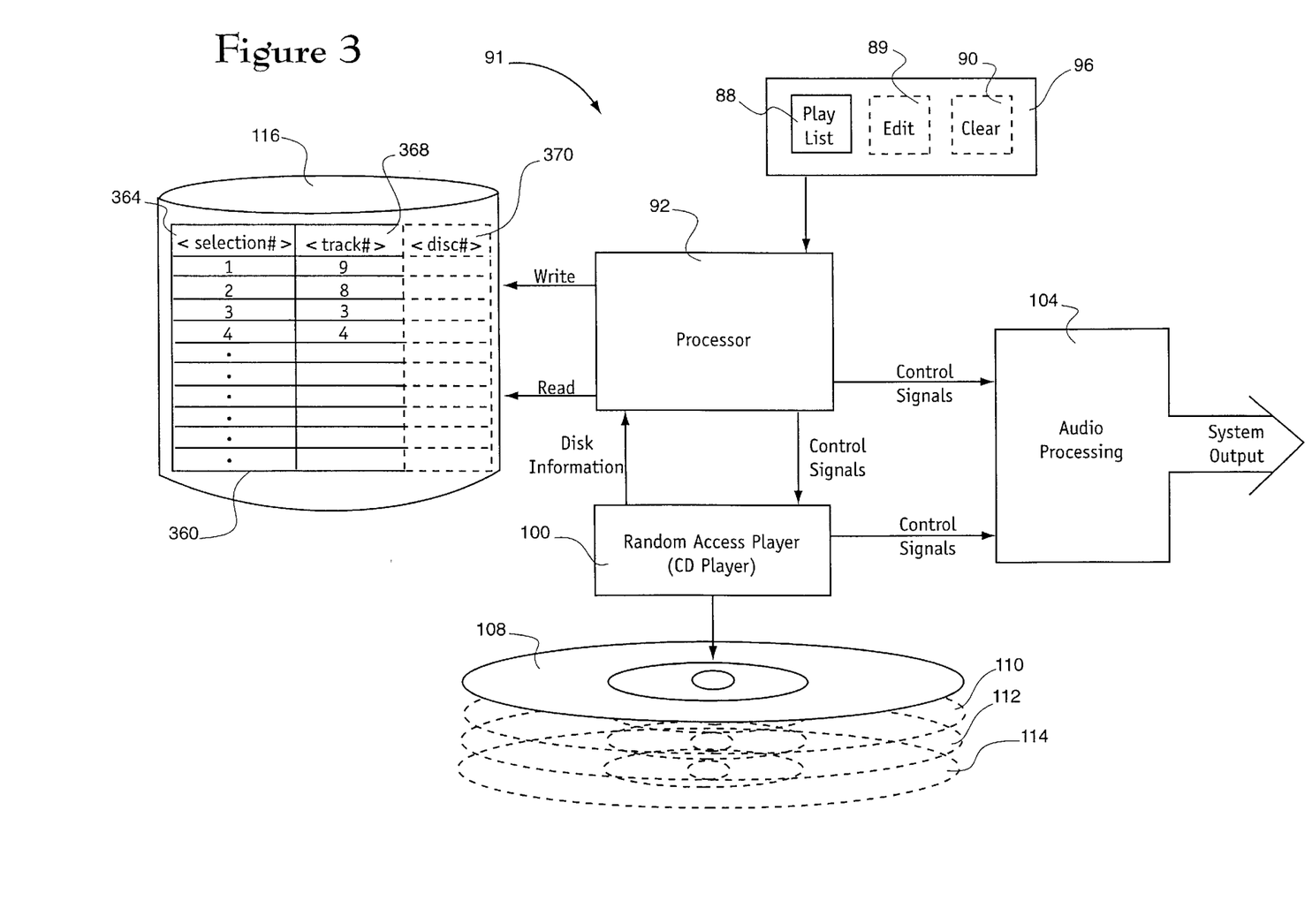
FIG. 3 is a schematic of the play list system of a preferred embodiment of the present invention.

FIG. 3 is a schematic of the play list system 91 of the preferred embodiment of the present invention. The play list system 91 is controlled by a processor 92, such as a microcomputer, that receives user requests from an interface panel 96, stores the play list in a data storage device 116, and provides control signals to the random access player 100 (i.e. CD player) and audio processing unit 104 for playing a disc 108.

When the system 20 operator requests the execution of a play list via button 88, the processor 92 will access the data storage device (or memory device) 116 that contains a play list data structure 360. The processor 92 utilizes the information (e.g., selection number 364 and associated information set number 368) stored in this data structure 360 in order to provide the random access player 100 with the necessary control signals such that the selected information sets will be played in the order as found in the data structure. For example, when the play list is initially activated, the processor 92 will read the data structure 116 to determine the first selection that is to be played (if a play list currently exists). Once this determination is made, the processor 92 issues the control signals to the random access player 100 for audio generation of this first selection of the play list. When the first selection finishes, the information set associated with the second selection, will be played. This process continues until the play list has been exhausted, after which the processor 92 repeats the play sequence, starting with the first selection.

The capability to create and modify the play list is provided to the operator with add, erase, and clear functions. The clear function erases all the currently selected selections (i.e., the associated information set numbers 368) stored in the play list data structure 360. In addition, the system may be configured to activate the clear function when a disk is ejected. It should be understood that while this description of the preferred embodiment is directed to a single disc configuration, the present invention is readily applicable to a system having multiple discs (110, 112, 114). In such a multiple disc configuration, the data structure 360 may be modified to include disk information 370 that identifies the disc that corresponds to each selection number 364 and information set number 368.

Activation of the erase function during play list operation erases the currently playing information set from the play list and reorders the selections to maintain continuity in the play list data structure 360. (Note: The capability to erase a selection is only available while the play list is active.) For example, if the random access player 100 is currently playing selection number 5 of the play list, and the edit function is activated, the processor will remove selection 5 from the data structure and move selection number 6 to the vacated selection 5 position. This is then repeated for each of the subsequent selection positions that are contained in the data structure.

While the erase function only erases a playing selection when the play list is active, the add function introduces a new selection to the play list only when the play list function is not active. Activation of the add function places the selection currently being played by the random access player into the play list. For example, if track 4 is playing and the add function is activated, track 4 is placed in the next available position of the play list data structure 360.

Figure 4:
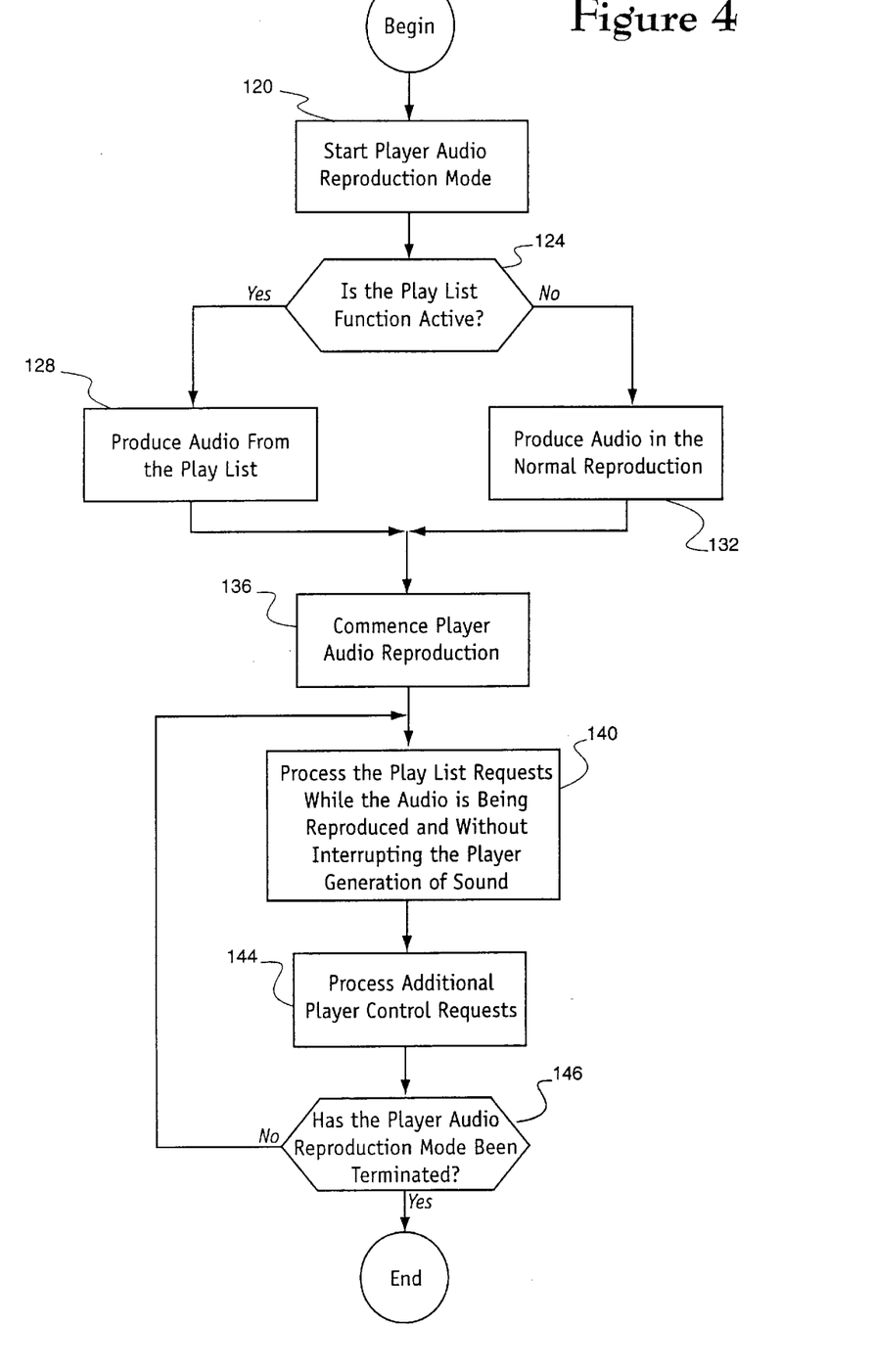
FIG. 4 is a flow chart showing an overview of the play list procedure.

FIG. 4 illustrates an overview of the play list method. It should be understood that unless indicated otherwise, the procedures to be subsequently described do not require activation of a programming mode that ceases the generation of audio output by the player. Accordingly, selections can be identified by their sound. Thus, as will be seen, an information display is not needed by the operator to create or modify the play list, but may be used to let a user know whether the play list function is on or off.

Referring to FIG. 4, once the CD player has been selected, the player enters an audio reproduction mode (step 120) that activates the hardware associated with the CD player. Once in this mode, a determination is made by the processor as to whether the play list function is active (step 124). If the play list function is active, the player will produce audio from the play list (step 128), otherwise audio will be reproduced in the respective order as found on the CD, i.e. normal reproduction mode (step 132). After it is determined whether the audio is to be produced from the play list or in the sequential order as found on the disc, player audio reproduction is commenced (step 136). The player then processes play list requests while the sound is emanating from the player with no interruption of play (step 140), unless requested or the circumstances warrant a halt in sound reproduction. The play list requests that are available to an operator include initiating a play sequence with the currently stored play list, ending an active play list sequence, adding a selection to the play list, deleting a selection from the play list, and clearing all the stored selections from the play list.

After the play list requests are processed (step 140), additional player control requests are processed (step 144), including previous selection (forward) and next selection (reverse) commands. It should be readily understood that a previous selection request will cause the player to generate audio based upon the record in the position prior to the current record being played and the next selection function will cause the player to generate audio based upon the record in the position subsequent to the current record being played. It should also be understood that if the player is generating sound based upon play list selections, the previous and next selection requests will move forward and backward in the play list, and if the player is in a normal operating mode, the previous and next selection requests will move forward and backward in the order that the records are stored on the disc.

After the additional player control requests have been processed, a determination is made as to whether the player reproduction mode has been terminated (step 146). If the mode has not been terminated, processing of the play list requests and player control requests (if any) (steps 140 and 144) is repeated. Otherwise, the procedure is ended (step 147).

Figure 5A:
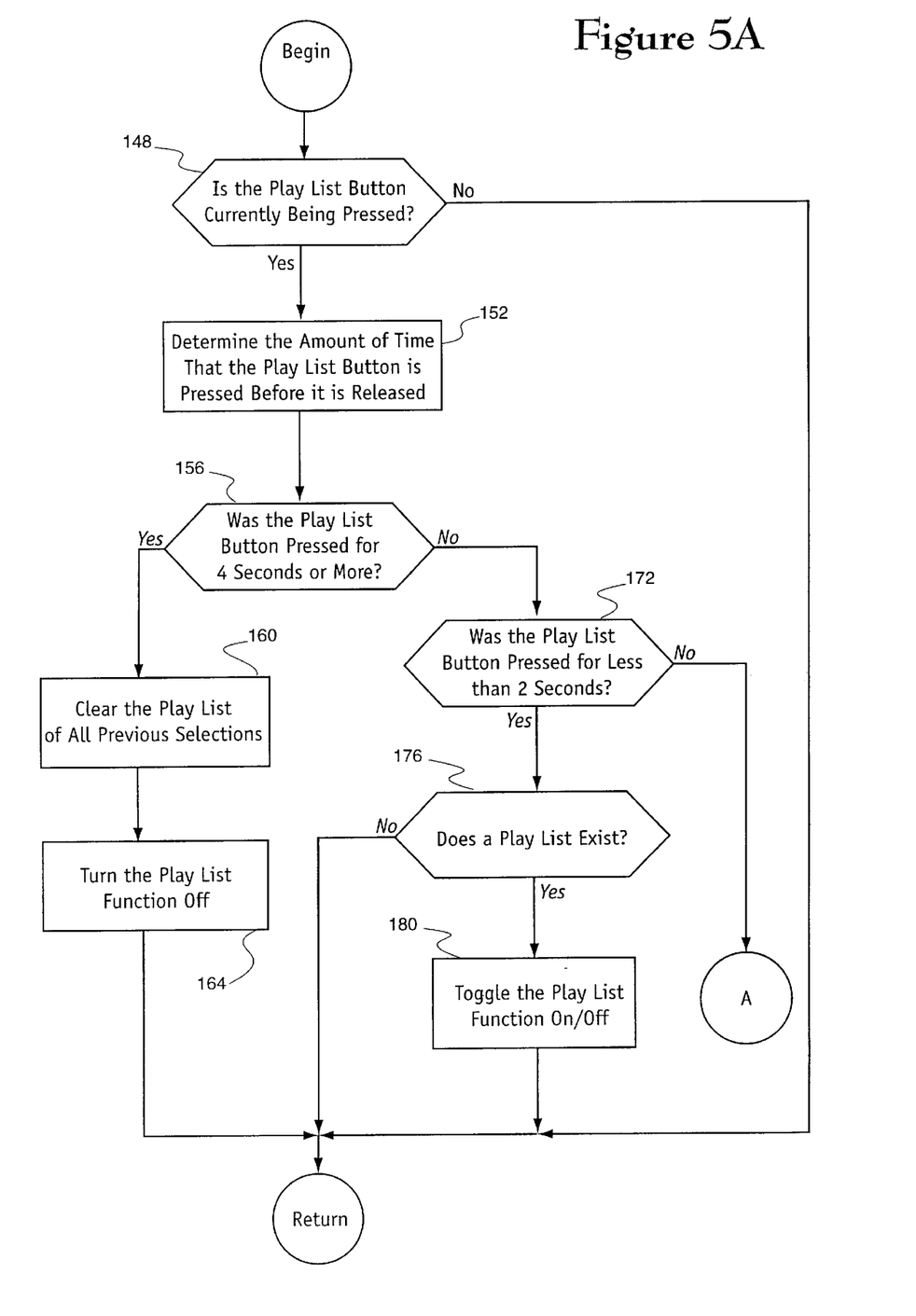
FIGS. 5A and 5B are flow charts showing the procedure associated with a single button implementation for processing play list requests.
Figure 5B:
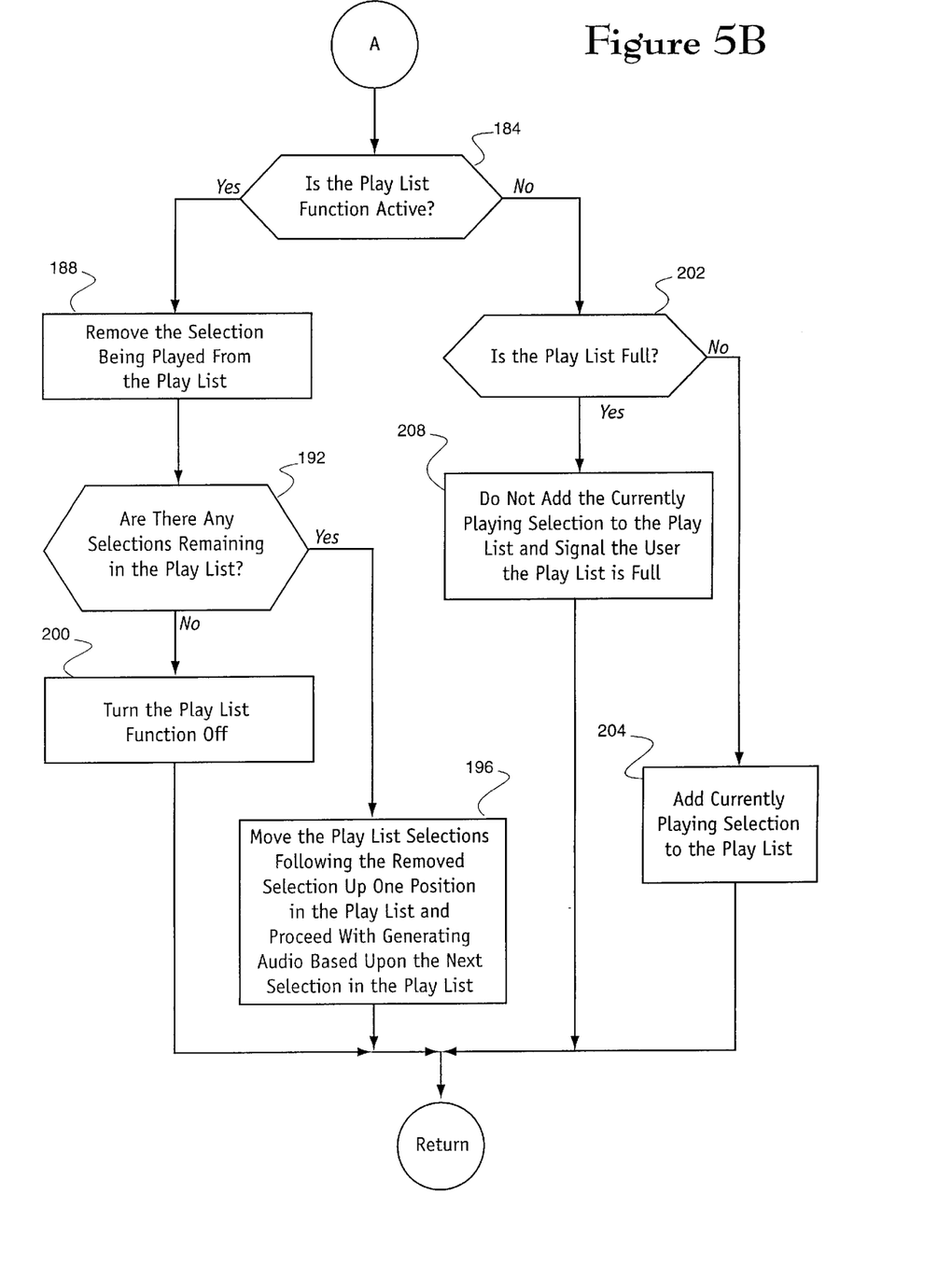

The step of processing play list requests (step 140) can be implemented such that all the play list requests are communicated to the player with a single user control button. In this illustration, the single button is the play list button 88 (as shown in FIGS. 2 and 3). Referring to FIGS. 5A and 5B, the procedure for communicating play list requests with only the play list button is shown. Initially, a determination is made as to whether the play list button is currently being pressed by the user (step 148). If the play list button is not being pressed, there is no user request to process. However, if the play list button is selected, the amount of time the play list button is pressed is measured (step 152), and this period is subsequently used to identify the play list request to be performed.

In the event that the play list button was pressed for 4 seconds or more (step 156), the clear function is activated, thereby deleting the currently stored play list (step 160). Once the play list selections are removed from the data storage device, the play list is turned off (step 164) as there are no selections in the play list to perform. If the play list button was pressed for less than 2 seconds (step 172) and a play list does exist (step 176), the play list is turned off if active, and turned on if inactive (180).

A play list button that is pressed and held for a time interval of between 2 and 4 seconds indicates that a selection is to be added to the play list or a selection contained in the play list is to be deleted. In order to determine if a play list addition or deletion is to be performed, an initial determination is made as to whether the play list is active (step 184). If the player is generating sound based upon a play list, the selection currently being played is removed from the play list (step 188). If selections still remain in the play list after the removal (step 192), the play list selections following the removed selection are moved up in the play list and the play proceeds with the next selection contained in the play list (step 196). If selections do not remain in the play list after the removal (step 192), the play list function is turned off (step 200).

A play list button that is held for between 2 and 4 seconds in conjunction with determination that the play list function is inactive indicates the add function is desired. If space is available for another selection in the play list (step 202) (i.e., the play list data structure is not full), the selection currently being played is appended to the end of the play list (step 204). In the event that the play list is full, the addition of a selection to the play list is not conducted and a signal, in the form of a sound or display, is generated by the system to indicate the full capacity (step 208).

Figure 6A:
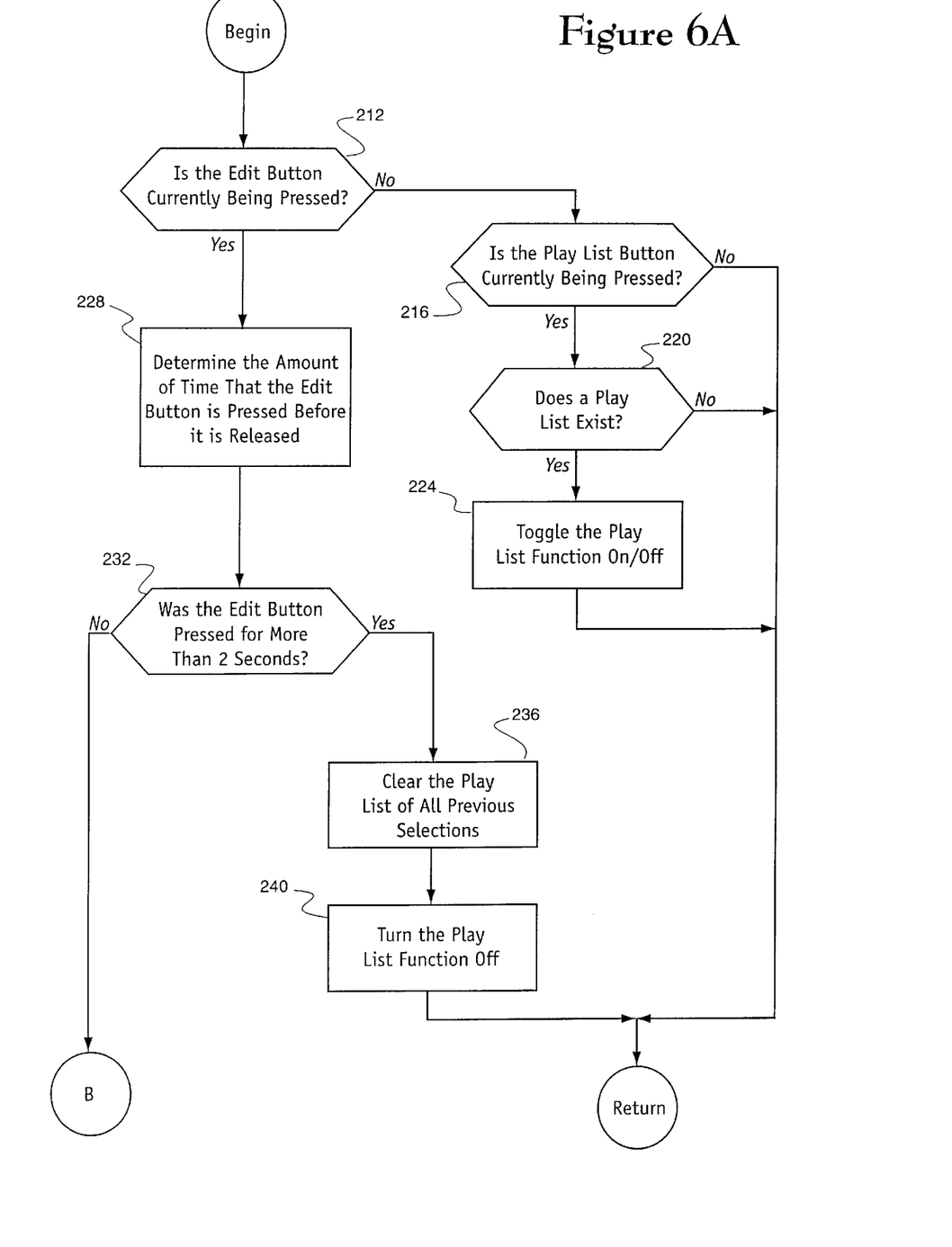
FIGS. 6A and 6B are flow charts showing the procedure associated with a two button implementation for processing play list requests.
Figure 6B:
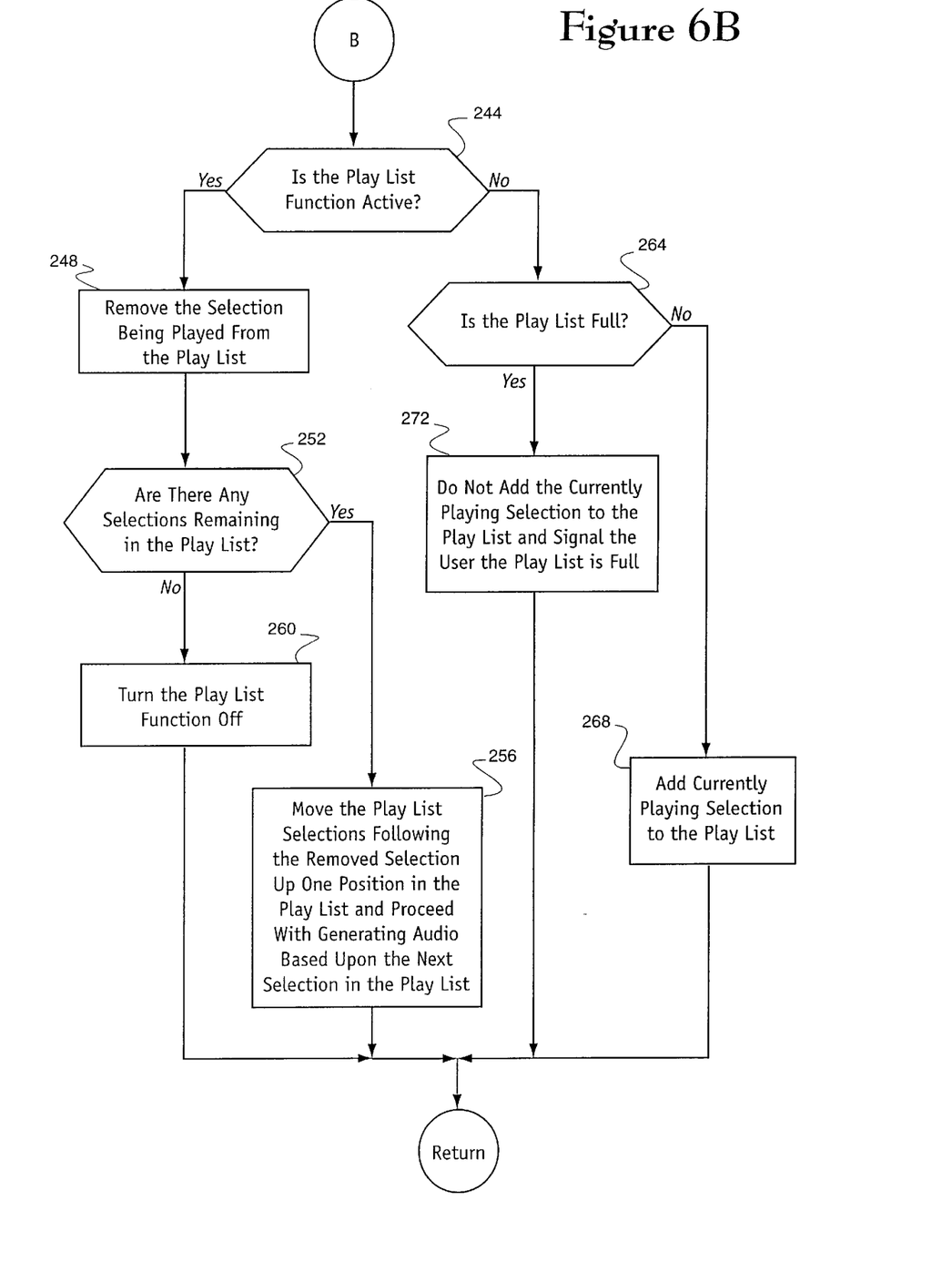

As hereinafter indicated, the step of processing play requests can also be implemented using two control buttons. Referring to FIGS. 6A and 6B, the procedure for communicating play list requests with two buttons is shown. For this illustration, the two buttons are the play list button 88 and the edit button 89 (as shown in FIGS. 2 and 3). Initially, a determination is made as to whether the edit button is being pressed (step 212). If the edit button is not selected, a determination is made as to whether the play list button is being pressed (step 216). In the event that the play list button has been selected and a determination is made that a play list does exist (step 220), the play list is turned off if active, and turned on if inactive (step 224). In the event that the edit button is not selected and the play list button is not being pressed or the edit button is not selected and the play list button is being pressed but a play list does not exist, no action is taken by the system.

In the event that the edit button has been selected, a measurement is made as to the amount of time this button is pressed. If the edit button was pressed for more than 2 seconds (step 232), the currently existing play list is cleared of all selections (step 236), and the play list function is turned off (step 240).

An edit button that was pressed for less than 2 seconds indicates that the currently playing selection is to be added to the play list or deleted from the play list. In order to determine which of these two actions are to be conducted, an initial determination is made as to whether the play list function is active (step 244). If the player is generating sound based upon the play list (i.e., the play list function is active), the selection currently being played is removed from the play list (step 248), and if selections still remain in the play list after this track is removed (step 252), the play list selections following the removed selections are moved up in the play list order (step 256) and the player proceeds with the next selection in the play list. If the removal of the currently playing selection results in emptying the play list (i.e., no selections are contained in the play list), the play list function is turned off (step 260).

Once a determination is made that the edit button was held for less than 2 seconds (step 232) and the play list function is inactive (step 244), a determination is made as to whether the play list is full (step 264). If the play list has available space, the selection currently being played is to be added to the play list (step 268). In the event that the play list is full, the desired selection is not added to the play list and a signal, in the form of a sound or display, is generated by the system to indicate the full capacity of the play list (step 272).

Figure 7A:
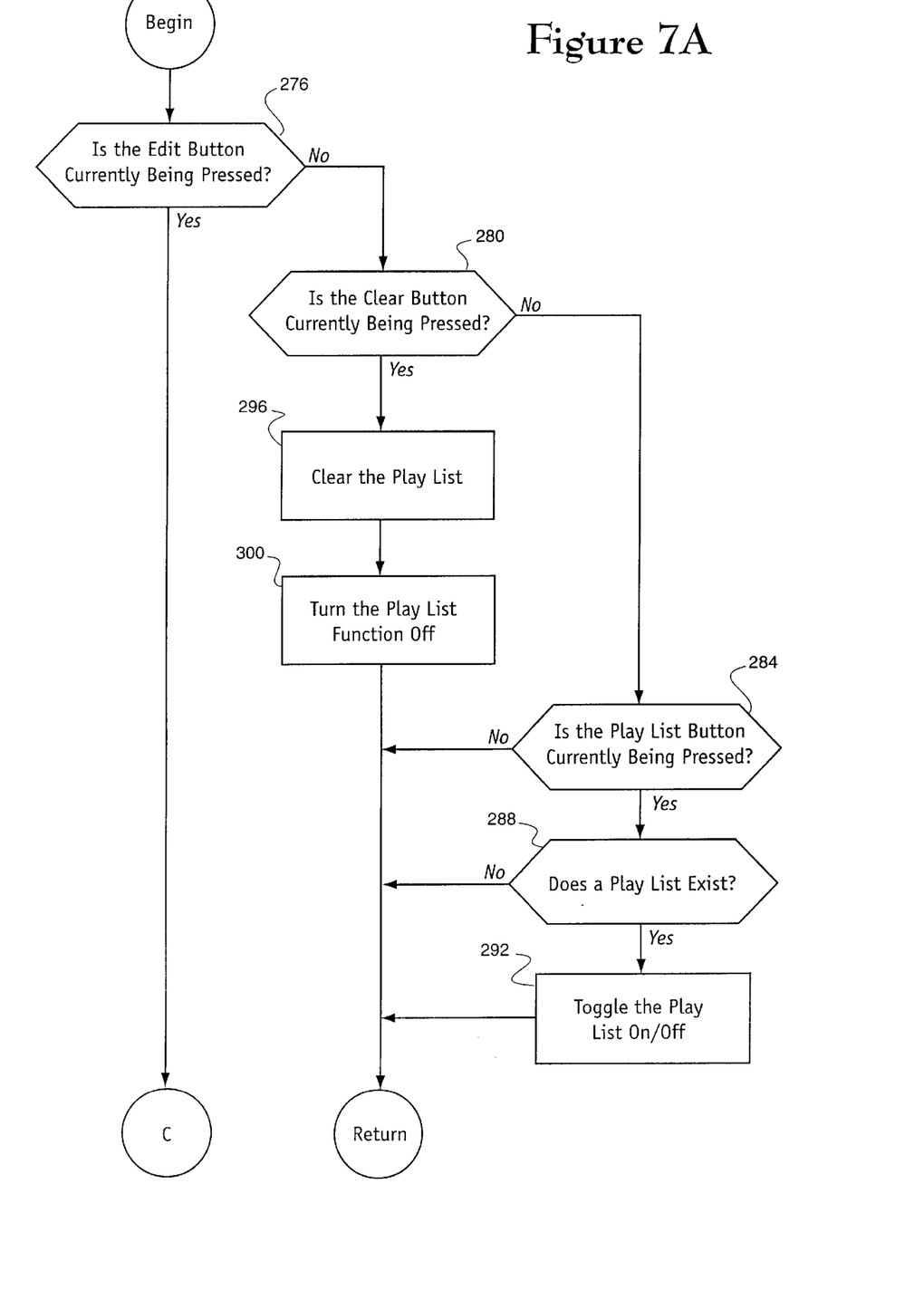
FIGS. 7A and 7B are flow charts showing the procedure associated with a three button implementation for processing play list requests.
Figure 7B:
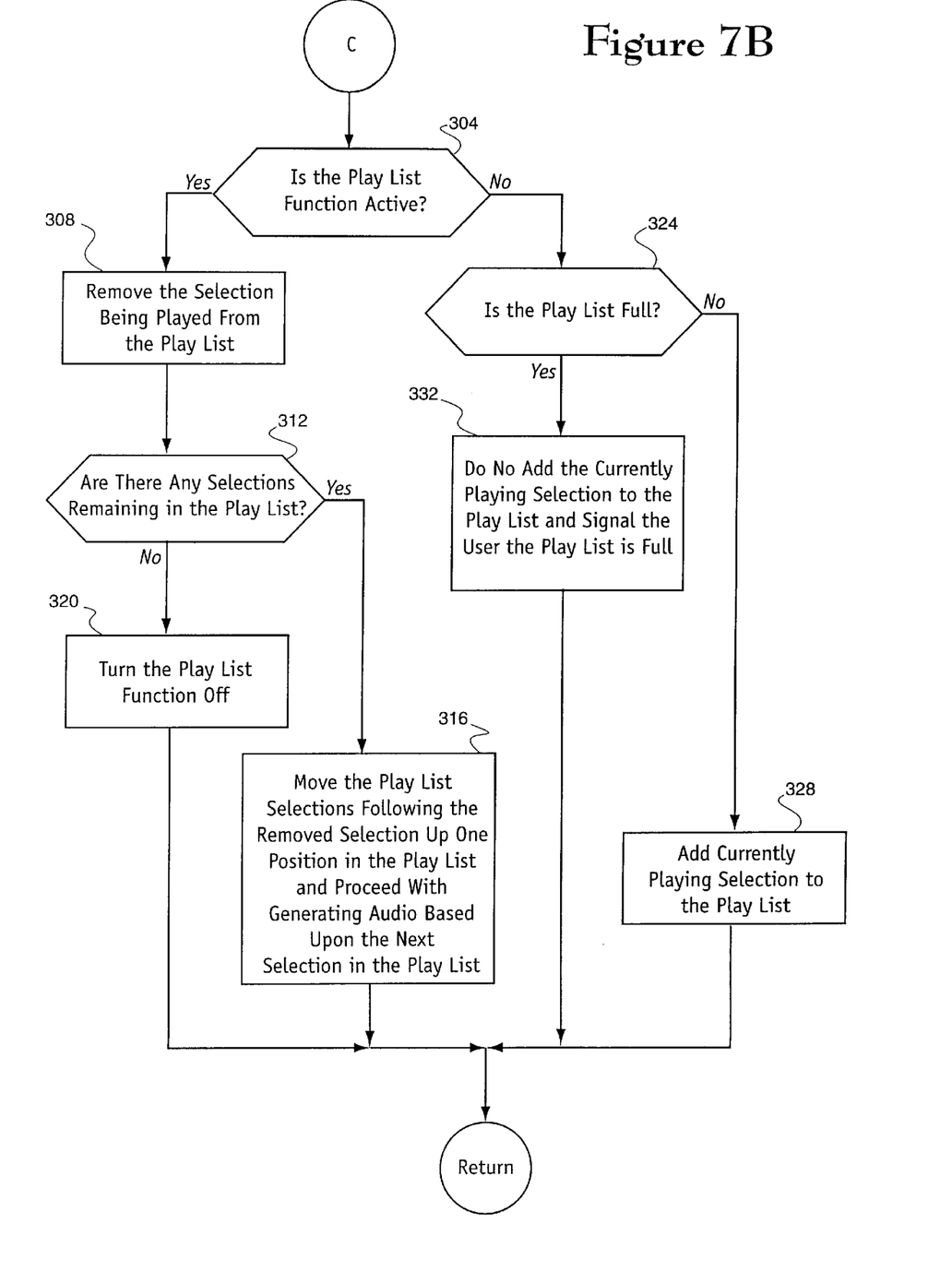

As hereinafter indicated, the step of processing play requests can also be implemented using three control buttons. Referring to FIGS. 7A and 7E, the procedure for communicating play list requests with three buttons is shown. For this illustration, the three buttons are the play list button 88, edit button 89, and clear button 90 (as shown in FIGS. 2 and 3). Initially, a determination is made as to whether the edit button is currently being pressed (step 276). If the edit button is not selected, a determination is made as to whether the clear button is being pressed (step 280), and if not, whether the play list button is being pressed (step 284). In the event that the clear button is not being selected, but the play list button is currently activated, a determination is made as to whether a play list exists (step 288), and if so, the play list is turned off if active, and turned on if inactive (step 292). In the event that the clear button and the play list button are not currently selected, no action is taken by the system.

If the clear button has been pressed, the currently existing play list is cleared of all selections (step 296), and the play list function is turned off (step 300), as there are no selections in the play list to be played.

Returning to the determination as to whether the edit button has been pressed (step 276), if the edit button has been activated, an initial determination is made as to whether the play list function is active (step 304). If the player is generating sound based upon the play list (i.e., the play list function is active), the selection currently being played is removed from the play list (step 308), and if selections still remain in the play list after the removal (step 312), the play list selections following the removed selections are moved up in the play list (step 316) and the player proceeds with the next selection in the play list. If the removal of the currently playing selection results in emptying the play list (i.e. no selections are contained in the play list), the play list function is turned off (step 320).

In the event that the edit button is active and the play list function is inactive an add request has been received. If a selection addition is requested, a determination is made as to whether there is available room for another selection in the play list (step 324). If the play list is not full, the selection currently being played is added to the play list (step 328). In the event that the play list is full, the desired selection is not added to the play list and a signal, in the form of a sound or display, is generated by the system to indicate the full capacity of the list (step 332).

With each of these procedures an individual can create or modify a play list without unpleasant interruptions to the player output. In the case of the car stereo system, this means the selections or deletions can be made by simply listening to the audio generated. Therefore, a CD player system display does not need to be referenced. Furthermore, the procedures demonstrate that the play list functions may be requested with a simplistic control configuration.

From the foregoing, it can be seen that a system and methodology is provided for creating and modifying the play list of a random access player that does not require entering a programming mode that inherently terminates player generation of sound or images. In addition, the system and methodology allow generation and manipulation of a play list with a simplistic arrangement of interface controls and without the need for visual or audio aids beyond the sound or video output of the player.

Those skilled in the art can now appreciate from this description that the broad teachings of the present invention can be implemented in a variety of forms. Therefore, the true scope of the invention is vast, and other modifications will become apparent to the skilled practitioner upon a study of the drawings, specification, and following claims.

What is claimed:

1. A method for altering a play list of a Random Access Player without interrupting the generation of output by the Player, comprising the steps of:
    initiating a reproduction mode that activates the Random Access Player;
    commencing the generating of output by the Random Access Player;
    receiving play list requests while the Random Access Player is generating the output;
    processing the received play list requests while the Random Access Player is generating the output such that the play list is altered without interrupting the generation of output by the player;
    measuring a period of time that a first user control button is activated;
    deleting from the play list a plurality of selections that define a sequence if the measured period of time that the first user control button is activated is within a first defined interval;
    controlling the Random Access Player's use of the play list based upon the measured period of time that the first user control button is activated being within a second defined interval; and
    altering one of said plurality of selections that define a sequence if the measured period of time that the first user control button is activated is within a third defined interval.

2. A method for altering a play list of a Random Access Player without interrupting the generation of output by the Player, comprising the steps of:
    initiating a reproduction mode that that activates the Random Access Player;
    commencing the generating of output by the Random Access Player;
    receiving play list requests while the Random Access Player is generating the output;
    processing the received play list requests while the Random Access Player is generating the output such that the play list is altered without interrupting the generation of output by the player;
    identifying the activation status of a first user control button and a second user control button;
    measuring a period of time that the first control button is activated;
    deleting from the play list a plurality of selections that define a sequence if the measured period of time that the first user control button is activated is within a first defined interval;
    altering one of said plurality of selections that define a sequence if the measured period of time that the first user control button is activated is within a third defined interval; and
    controlling the Random Access Player's use of the play list based upon the activation status of the first user control button and the second user control button.

3. A method for altering a play list of a Random Access Player without interrupting the generation of output by the Player, comprising the steps of:
    initiating a reproduction mode that that activates the Random Access Player;
    commencing the generating of output by the Random Access Player;
    receiving play list requests while the Random Access Player is generating the output;
    processing the received play list requests while the Random Access Player is generating the output such that the play list is altered without interrupting the generation of output by the player;
    identifying the activation status of a first user control button, a second user control button, and a third user control button;
    deleting from the play list a plurality of selections that define a sequence based upon the activation status of the first user control button;
    controlling the Random Access Player's use of the play list based upon the activation status of the second user control button; and
    altering one of said plurality of selections that define a sequence based upon the activation status of the third user control button.

4. The method of claim 1, further comprising the steps of:
    determining whether the output is to be generated based upon a sequence defined by the play list; and
    producing output in the sequence defined by the play list if the determination is made that the output is to be generated based upon the play list.

5. The method of claim 1, further comprising the step of processing player control requests.

6. An apparatus for altering a play list without interrupting the generation of an output by a Random Access Player that is generating the output in a sequence defined by the play list, comprising:
    a memory having a data structure that stores data which identifies the sequence of the play list;
    a processor that accesses the memory, the processor providing a control signal for the generation of output by the Player based upon the access to the data stored in the data structure of the memory; and an interface control panel that receives a user request and transmits the request to the processor, the processor accessing the memory and altering the data stored in the data structure of the memory without interrupting the generation of output by the Random Access Player;

a first user control button arranged on the interface control panel, wherein the processor measures a period of time that a first user control button is activated; deletes from the play list a plurality of selections that define a sequence if the measured period of time that the first user control button is activated is within a first defined interval: controls the Random Access Player's use of the play list based upon the measured period of time that the first user control button is activated being within a second defined interval; and alters one of said plurality of selections that define a sequence if the measured period of time that the first user control button is activated is within a third defined interval.

7. The apparatus of claim 6, wherein the data includes a selection number.

8. The apparatus of claim 6, wherein the data includes an information set number.

9. The apparatus of claim 6, wherein the data includes a disc number.

10. The apparatus of claim 6, wherein the interface control panel has a second button.

11. The apparatus of claim 6, wherein the interface control panel has a second button and third button.

12. The apparatus of claim 6, wherein the Random Access Player is a single disc player.

13. The apparatus of claim 6, wherein the Random Access Player is a multiple disc player.

14. The apparatus of claim 6, wherein the output generated by the Random Access Player is audio.

15. The apparatus of claim 6, wherein the output generated by the Random Access Player is video.

* * * * *